(12) United States Patent
Hamamoto

(10) Patent No.: US 6,777,624 B2
(45) Date of Patent: Aug. 17, 2004

(54) ELECTRONIC BALANCE WITH A REMOTE ERROR REPORTING VIA THE INTERNET AND A DISPLAY FOR INFORMING A USER OF CORRECTIVE MEASURES FROM A REMOTE SERVICE CENTER

(75) Inventor: Hiroshi Hamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 158 days.

(21) Appl. No.: 10/142,449

(22) Filed: May 10, 2002

(65) Prior Publication Data

US 2002/0179337 A1 Dec. 5, 2002

(30) Foreign Application Priority Data

May 14, 2001 (JP) ........................................ 2001-142651

(51) Int. Cl.[7] .............................................. G01G 19/22
(52) U.S. Cl. ..................... 177/25.13; 177/50; 702/101; 702/173; 705/414; 705/416
(58) Field of Search ......................... 177/25.11–25.19, 177/50; 702/101, 173; 705/414, 416; 345/733

(56) References Cited

U.S. PATENT DOCUMENTS

| | | | | |
|---|---|---|---|---|
| 4,804,052 A | * | 2/1989 | Griffen | 177/25.14 |
| 6,177,932 B1 | * | 1/2001 | Galdes et al. | 345/733 |
| 6,566,613 B1 | * | 5/2003 | Gesuita et al. | 177/25.18 |
| 6,576,849 B2 | * | 6/2003 | Bliss et al. | 177/25.13 |
| 6,580,037 B1 | * | 6/2003 | Luke | 177/25.13 |

* cited by examiner

*Primary Examiner*—Randy W. Gibson
(74) *Attorney, Agent, or Firm*—Rankin, Hill, Porter & Clark LLP

(57) ABSTRACT

An electronic balance provided with a self-diagnosis function comprises a connection port for connecting the electronic balance to an external communication terminal. When a self-diagnosis function is performed, the previously stored address in the electronic balance is used to connect the electronic balance over a line to a specific Web site through the external communication terminal connected to the connection port so as to transfer a diagnosis data to the Web site. At the Web site, the diagnosis data is evaluated and the evaluation result containing measures to be taken in response to the diagnosis data is returned. The electronic balance displays contents of the returned data on a display section.

7 Claims, 2 Drawing Sheets

ELECTRONIC BALANCE WITH A REMOTE ERROR REPORTING VIA THE INTERNET AND A DISPLAY FOR INFORMING A USER OF CORRECTIVE MEASURES FROM A REMOTE SERVICE CENTER

BACKGROUND OF THE INVENTION

1. Field of the Invention

This invention relates to an electronic balance and a method of evaluating the electronic balance. More particularly, the invention relates to an electronic balance and a method of evaluating the electronic balance comprising a self-diagnosis function. The invention can be applied not only to an electronic balance for generating an electromagnetic force corresponding to a load on a pan and detecting the load on the pan from the magnitude of the generated electromagnetic force etc., but also to an electronic weighing instrument comprising a load sensor of a load cell etc.

2. Description of the Related Art

In an electronic balance and an electronic weighing instrument (which will be hereinafter referred as electronic balance), generally, a pan is engaged in a load detection section, and a load acting on the pan is detected by the load detection section. The detection data is input to a data processor such as a microcomputer every moment for performing averaging processing and digital filter processing for the input data, then the provided data is converted into a weight value, and the weight value is displayed on a display section as a measurement value.

As such an electronic balance, an electronic balance has been known which comprises a self-diagnosis function for performing an inspection of failure or performance. The self-diagnosis function is a function for conducting a diagnosis of variations in the detection data outputted every moment from the load detection section, fluctuation state of the display value, hardware problems containing the display section, etc., according to a preset procedure. The self-diagnosis result is displayed with a preset code on the display section for displaying the measurement value.

In the electronic balance provided with the self-diagnosis function in the related art as described above, when a failure or performance problem occurs, the self-diagnosis result indicating the problem is displayed as a code, etc. However, the user must determine proper measures to be taken against the self-diagnosis result, such as countermeasures to be taken against the failure, etc., or processes to be taken in response to the performance inspection result. If the user takes erroneous measures, there is a possibility that the electronic balance will be placed in a disabled state. Therefore, there is a problem that in some cases, the user cannot make effective use of the self-diagnosis result provided by the self-diagnosis function contained in the electronic balance.

Further, in the electronic balance in the related art, the microcomputer built in the electronic balance performs the self-diagnosis function. Therefore, there is also a problem that the diagnosis technique is limited and a complicated performance inspection etc. cannot be performed.

SUMMARY OF THE INVENTION

It is therefore an object of the invention to provide an electronic balance that can inform the user of measures to be taken against a self-diagnosis result, such as countermeasures to be taken against a failure and processes to be taken in response to a performance inspection result, etc., and can also perform a more detailed diagnosis and inform the user of the detailed diagnosis result and measures to be taken against the diagnosis result, thus enabling the user to make effective use of a self-diagnosis function contained in the electronic balance.

To the end, according to the invention, there is provided an electronic balance comprising: a load detection section for detecting a load on a pan; a calculation section for calculating a weight value based on a load data provided by the load detection section; a self-diagnosis section for conducting a self-diagnosis function of the electronic balance; a display section for displaying the weight value provided by the calculation section; a connection unit for connecting the electronic balance to an external communication terminal; a communication control section for connecting the electronic balance to a predetermined Web site using a previously stored address through the external communication terminal connected to the connection unit, transferring a diagnosis data provided by the self-diagnosis section through an Internet to the Web site, and receiving an evaluation result of the diagnosis data transferred from the Web site; and a display control section for controlling the display section to display the evaluation result of the diagnosis data.

The electronic balance according to the invention is different from the electronic balance in related art which displays the self-diagnosis result provided by the self-diagnosis function of the electronic balance itself on the display section as a code. In the electronic balance according to the invention, the electronic balance is connected to the external communication terminal such as a personal computer, a telephone, or a mobile telephone via the connecting port, and then the electronic balance is connected to a preset specific Web site, namely, the Web site opened by the manufacturer etc., of the electronic balance, through the external communication terminal. The diagnosis data provided by the self-diagnosis function of the electronic balance is transferred to the Web site connected to the electronic balance through the Internet. At the Web site, a more detailed diagnosis is conducted, and measures to be taken against the diagnosis result etc. are evaluated. The evaluation result obtained from the Web site is displayed on the display section of the electronic balance to inform the user of the evaluation result.

That is, the electronic balance is connected to the external communication terminal that can be connected to the Internet, such as a personal computer, and the communication control section transfers the diagnosis data provided by the self-diagnosis function to the specific Web site using the previously stored address through the external communication terminal. At the Web site, a more detailed diagnosis is conducted using the diagnosis data, and measures to be taken against the diagnosis result etc. are evaluated. The evaluation result is returned from the Web site through the Internet to the electronic balance. In the electronic balance, the display control section displays the returned evaluation result on the display section of the electronic balance. Therefore, it is possible to conduct a more detailed diagnosis and evaluate measures to be taken against the more detailed diagnosis result etc., than those with the self-diagnosis function of the electronic balance itself. Further, it is possible to inform the user of the diagnosis result, the measures to be taken against the diagnosis result, etc., provided from the Web site.

DETAILED DESCRIPTION OF THE INVENTION

Referring now to the accompanying drawings, there is shown a preferred embodiment of the invention.

Figure 1:
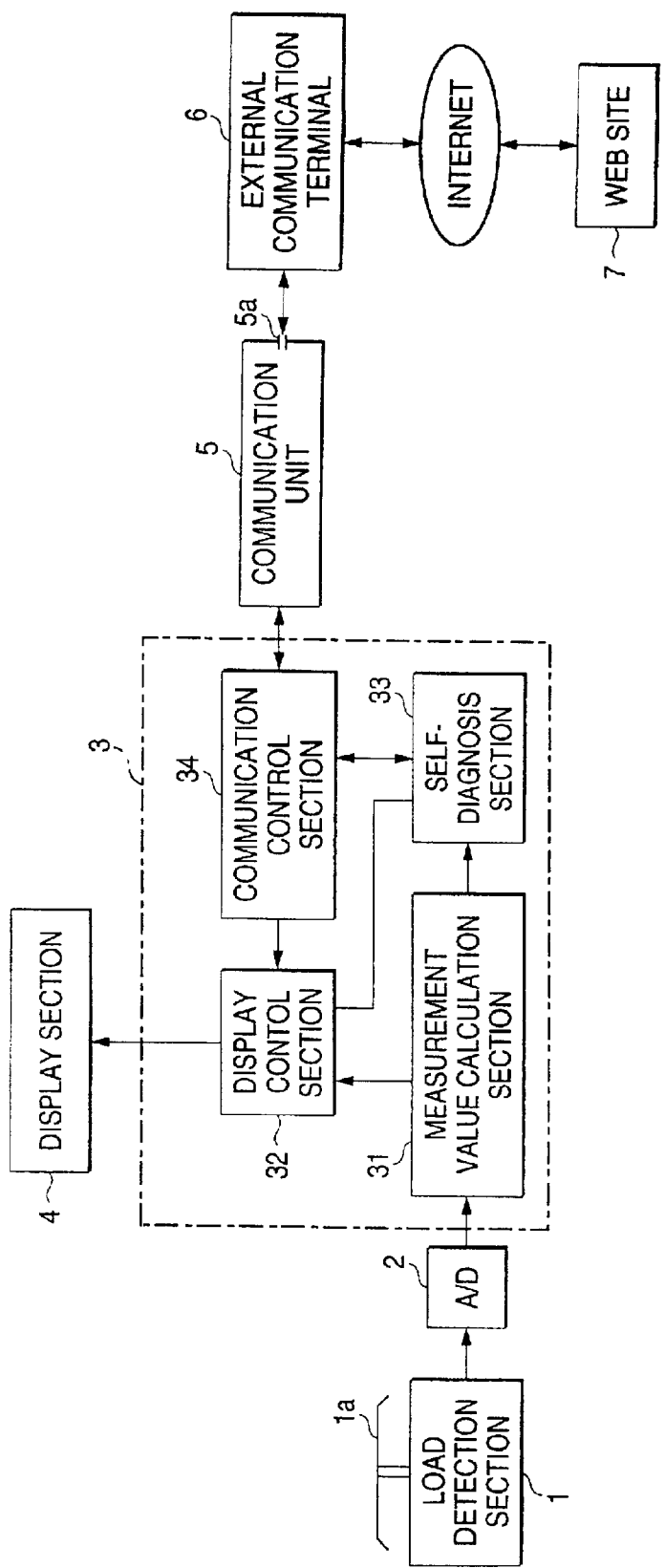
FIG. 1 is a block diagram to show the configuration of an electronic balance according to an embodiment of the invention.

FIG. 1 is a block diagram to show the configuration of an electronic balance according to an embodiment of the invention.

A load detection section 1 generates an electric signal corresponding to a load on a pan 1a. The electric signal is converted into a digital signal by an A-D converter 2 and the digital signal is input to a data processor 3 every moment. In addition to the A-D converter 2, a display section 4 and a communication unit 5 are connected to the data processor 3. The data processor 3 includes a microcomputer and its peripheral devices and operates in accordance with a program. In FIG. 1, the data processor 3 is shown as the block diagram for each function of the program.

The data processor 3 comprises a measurement value calculation section 31 and a display control section 32. In the measurement value calculation section 31, the load data, which is detected by the load detection section 1 and converted into a digital signal by the A-D converter 2, is subjected to averaging processing etc., and then is converted into a weight value. Then, the weight value is sent to the display control section 32, which then displays the weight value on the display section 4 as a measurement value.

The data processor 3 also comprises a self-diagnosis section 33 and a communication control section 34. The self-diagnosis section 33 operates on the basis of a self-diagnosis execution command generated by an operation of a switch or a key (not shown), for example, detects the state of each section of the electronic balance at the point in time when the command is generated, and performs an inspection of a failure or performance according to a preset known procedure. Here, the state of each section of the element balance includes variation state of the load data obtained every moment and fluctuation state of the display value on the display section 4 under the load data variation, the hardware operation state of the display section 4 etc., and the like.

The communication control section 34 enables the electronic balance to be connected to a specific Web site 7 for transferring data between the electronic balance and the Web site, using a previously stored Internet address. An external communication terminal 6 is connected to the communication unit 5 via a connection port 5a. The electronic balance is connected to the Web site 7 through the communication unit 5 and the external communication terminal 6. The external communication terminal 6 includes an external personal computer, a telephone, or a mobile telephone, for example, which can be connected to the Internet. The communication control section 34 operates at the timing as shown below.

Figure 2:
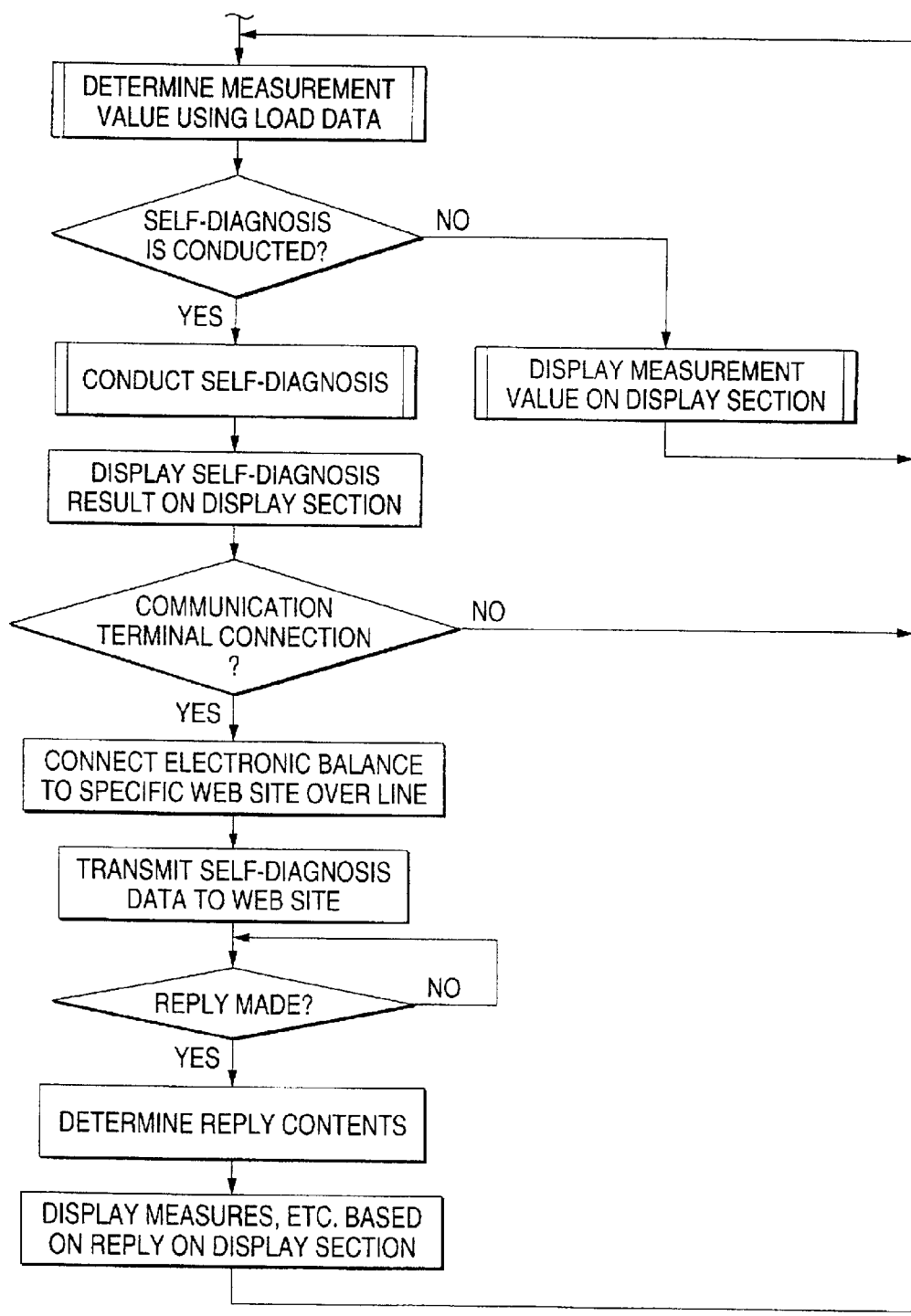
FIG. 2 is a flowchart to show the contents of a program written into a data processor 3 in the embodiment in FIG. 1.

FIG. 2 is a flowchart to show the contents of the program written into the data processor 3. The operation of the embodiment of the invention will be discussed with reference to FIG. 2.

When the above-described self-diagnosis execution command is not given, the display control section 32 displays the weight value, which is obtained by the measurement value calculation section 31 based on the data input every moment through the A-D converter 2, on the display section 4. As the self-diagnosis execution command is given in this state, the self-diagnosis section 33 operates and conducts a self-diagnosis. Then, the display control section 32 selects the code corresponding to the self-diagnosis result provided by the self-diagnosis section 33 from among predetermined codes and displays the selected code on the display section 4 as the self-diagnosis result. In this state, if the external communication terminal 6 such as a personal computer, a telephone, or a mobile telephone is connected to the connection port 5a of the communication unit 5, the communication control section 34 automatically operates and connects the electronic balance over line to the specific Web site 7 through the external communication terminal 6 using the previously stored Internet address. After checking that the electronic balance is connected over the line to the specific Web site 7, the communication control section 34 transfers self-diagnosis data provided by the self-diagnosis section 33 to the Web site 7.

The Web site 7 is opened by the manufacturer, the service company etc., of the electronic balance. In the Web site 7, using the transferred self-diagnosis data, the failure or performance inspection result for the electronic balance is evaluated, and further, a more detailed inspection of the failure or performance is performed and measures to be taken against the detailed inspection result is evaluated. The inspection result etc. is returned from the Web site 7 to the electronic balance, together with the countermeasures against the corresponding the failure and processes against the corresponding the performance inspection result, etc.

The electronic balance receives reply data returned from the Web site 7 at the communication unit 5 through the external communication terminal 6. Then, the reply data is transferred to the self-diagnosis section 33 through the communication control section 34 from the communication unit 5. The self-diagnosis section 33 distinguishes the data to be displayed, such as the evaluation result inducing the countermeasures to be taken against the failure, processes to be taken against the performance inspection result etc., from the reply data. Then, the display control section 32 displays the data to be displayed provided by the self-diagnosis section 33 on the display section 4 to inform the user of the state of the electronic balance, the countermeasures to be taken against the failure, the processes to be taken against the performance inspection result, etc.

If a failure or a performance problem occurs, the user can always take proper measures by taking the measures as displayed on the display section 4 and thus the burden on the user can be reduced.

As described above, according to the invention, the electronic balance (electronic weighing instrument) provided with the self-diagnosis function comprises the connection port for connecting the electronic balance to the external communication terminal, and previously stores the address of the specific Web site. The external communication terminal such as a personal computer or a telephone is connected to the connection port. When the self-diagnosis function is performed, the self-diagnosis data provided by the self-diagnosis function is automatically transferred through the external communication terminal to the specific Web site. At the Web site, using the self-diagnosis data, a more detailed diagnosis is conducted and the measures to be taken against the detailed diagnosis result are evaluated. The data, such as the diagnosis result, the measures to be taken against the diagnosis result, etc. are returned to the electronic balance from the Web site. The electronic balance displays the contents of the returned data on the display section for informing the user. Thus, the need for the user to determine the measures such as the countermeasures to be taken against the failure or the processes to be taken against the performance inspection result etc. is eliminated as compared with the electronic balance provided with the self-diagnosis function in the related where only the code corresponding to the failure and the performance inspection result is displayed. The user can always take proper measures by taking the measures as displayed and thus the burden on the user can be reduced. Further, the proper measures are always taken, so that the substantial operating rate of the electronic balance can be improved.

What is claimed is:

1. An electronic balance comprising:

a load detection section for detecting a load on a pan;

a calculation section for calculating a weight value based on a load data provided by said load detection section;

a self-diagnosis section for conducting a self-diagnosis function of said electronic balance;

a display section for displaying the weight value provided by said calculation section;

a connection unit for connecting said electronic balance to an external communication terminal;

a communication control section for connecting said electronic balance to a predetermined Web site using a previously stored address through the external communication terminal connected to the connection unit, transferring a diagnosis data provided by said self-diagnosis section through an Internet to the Web site, and receiving an evaluation result of the diagnosis data transferred from the Web site; and a display control section for controlling said display section to display the evaluation result of the diagnosis data.

2. The electronic balance according to claim 1, wherein said self-diagnosis function performs an inspection of a failure or performance of said electronic balance according to a preset procedure.

3. The electronic balance according to claim 1, wherein the evaluation result includes measures to be taken in response to the diagnosis data provided by the self-diagnosis section.

4. The electronic balance according to claim 2, wherein the evaluation result includes countermeasures or processes to be taken in response to a failure or performance inspection result provided by the self-diagnosis section.

5. The electronic balance according to claim 1, wherein the evaluation result includes a more detailed diagnosis result and measures to be taken in response to the more detailed diagnosis result based on the diagnosis data provided by the self-diagnosis section.

6. The electronic balance according to claim 1, wherein said communication unit includes a communication port for connecting said electronic balance and the external communication terminal.

7. A method of evaluating an electronic balance provided with a self-diagnosis function comprising:

performing the self-diagnosis function of said electronic balance to obtain a diagnosis data;

connecting said electronic balance to an external communication terminal;

connecting said electronic balance to a predetermined Web site using a previously stored address through the external communication terminal;

transferring the diagnosis data through an Internet to the Web site; and receiving and displaying an evaluation result of the diagnosis data transferred from the Web site.

* * * * *